United States Patent [19]

Schupner

[11] 3,990,548
[45] Nov. 9, 1976

[54] ADJUSTABLE HYDRAULIC DASHPOT

[75] Inventor: Willard J. Schupner, Palatine, Ill.

[73] Assignee: Efdyn Corporation, Chicago, Ill.

[22] Filed: Aug. 6, 1975

[21] Appl. No.: 602,383

[52] U.S. Cl. .................................. 188/313; 16/52;
138/43; 138/46; 188/318; 188/322
[51] Int. Cl.² ........................................ F16F 9/34
[58] Field of Search ............ 188/285, 286, 315, 313,
188/318, 322, 300, 319, 287; 138/43, 46;
16/51, 52, 66, 84

[56] References Cited
UNITED STATES PATENTS

| 1,613,782 | 1/1927 | Bauer | 188/313 |
| 2,148,839 | 2/1939 | Rossman et al. | 188/319 |
| 2,627,405 | 2/1953 | Hlatko et al. | 188/285 |
| 3,425,522 | 2/1969 | Gryglas | 188/315 |
| 3,645,365 | 2/1972 | Bomek | 188/285 |
| 3,666,256 | 5/1972 | Ellis et al. | 188/315 X |
| 3,731,770 | 5/1973 | Bindon | 188/287 X |

*Primary Examiner*—George E. A. Halvosa
*Attorney, Agent, or Firm*—Darbo, Robertson & Vandenburgh

[57] ABSTRACT

A hydraulic dashpot having a pressure tube with a port defining a metering orifice through which fluid is metered upon application of impact forces to a piston assembly slidable in the pressure tube, and wherein the pressure tube is rotatable for adjusting the position of the orifice relative to a spiral valve edge for varying the effective area of the orifice.

2 Claims, 7 Drawing Figures

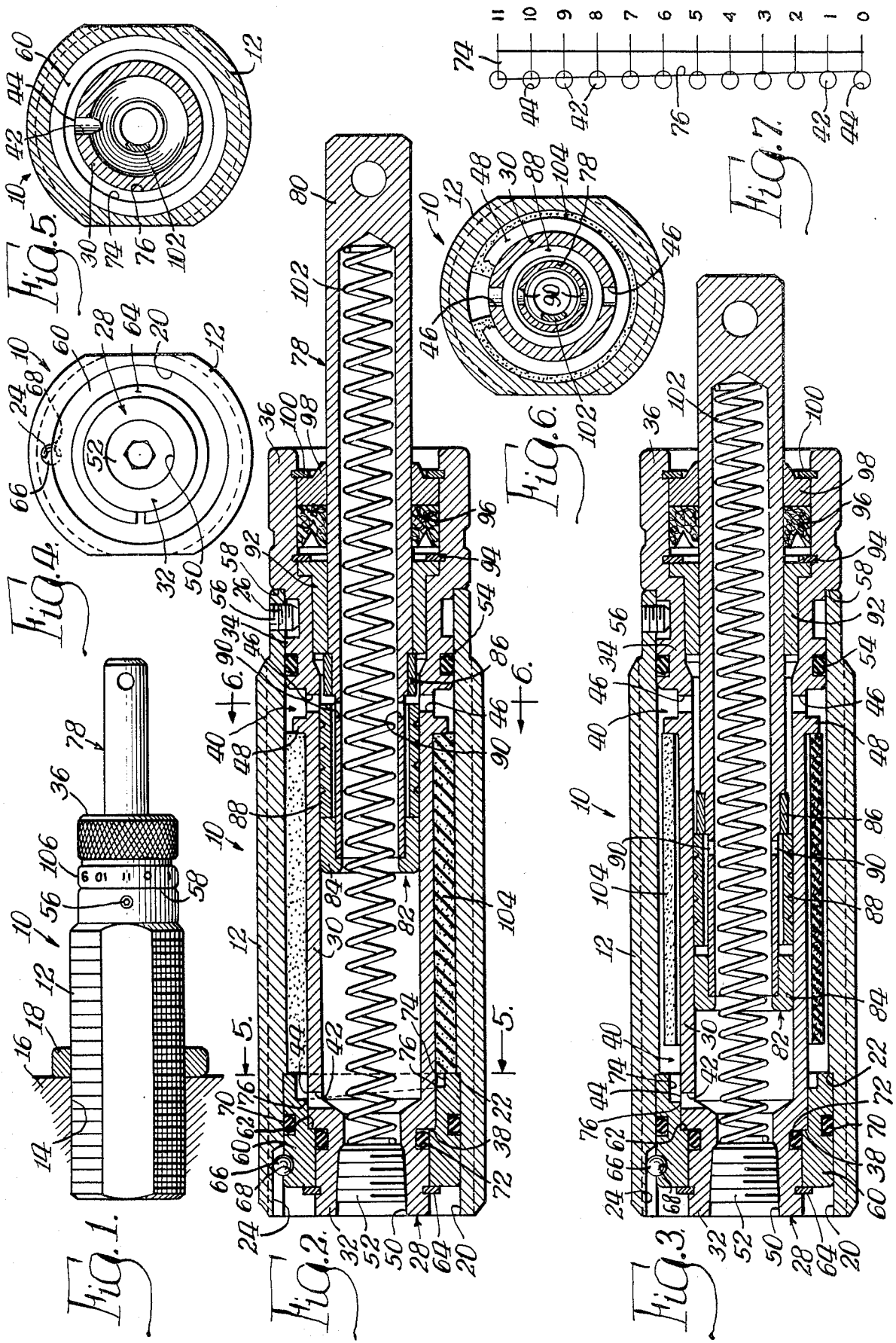

1

ADJUSTABLE HYDRAULIC DASHPOT

BACKGROUND OF THE INVENTION

1. Field of the Invention

The present invention relates generally to a hydraulic dashpot, which is adapted for damping out vibrational energy, for example, in machine applications and the like, and which is capable of being adjusted to absorb vibrations of differing kinetic energy quantities.

2. Description of the Prior Art

Hydraulic dashpots basically comprise a pressure tube filled with fluid and having slidably mounted therein a piston which is connected to a piston rod adapted to receive impact or vibrational forces. Heretofore, certain hydraulic dashpots have been provided with a metering orifice for the pressure tube through which fluid is forced when the dashpot is under load, and means for regulating the effective area of the metering orifice. Principally, prior orifice regulating means have not been as simple in construction, and have not offered as fine an adjustment, as might be desired; and prior dashpots otherwise have not been as efficient in operation, as durable in service, as compact in construction, and as economical to manufacture, as might be desired.

SUMMARY OF THE INVENTION

The hydraulic dashpot of the present invention comprises an elongated outer casing with a forward end and a rearward end. A pressure tube extends lengthwise within the casing and defines a chamber therebetween. A piston rod extends outwardly of the forward end of the casing for receiving impact forces; and a piston assembly, mounted on the piston rod, is axially movable within the pressure tube.

The pressure tube has a radial metering port formed in the wall thereof which defines an orifice open to the chamber. Surrounding the pressure tube within the casing is a metering sleeve having an inner periphery presenting a leading spiral valve edge adjacent the plane of the orifice for establishing the effective area thereof. Relative rotation between the pressure tube and the metering sleeve serves to adjust the relative positions of the orifice and the valve edge to vary the effective area of the orifice whereby to regulate the flow of fluid outwardly of the pressure tube through the metering port to the chamber as the piston assembly moves rearwardly in the pressure tube.

The arrangement of the elements of the hydraulic dashpot of the present invention, as described generally above and as will be described in greater detail hereinafter, overcomes the disadvantages of prior constructions noted above.

BRIEF DESCRIPTION OF THE DRAWING

FIG. 1 is a side elevational view of the hydraulic dashpot of the present invention;

FIG. 2 is a longitudinal median sectional view, on an enlarged scale, of the dashpot of FIG. 1;

FIG. 3 is a sectional view corresponding generally to FIG. 2, but shows the elements of the dashpot in a changed operating position;

FIG. 4 is an end elevational view of the dashpot of FIG. 2;

FIG. 5 is a transverse sectional view taken substantially along the line 5—5 in FIG. 2 looking in the direction indicated by the arrows;

FIG. 6 is a transverse sectional view taken substantially along the line 6—6 in FIG. 2 looking in the direction indicated by the arrows; and FIG. 7 is a schematic view showing various positions of the metering orifice of the dashpot in relation to the spiral valve edge, and the corresponding effective areas of the orifice.

DESCRIPTION OF THE PREFERRED EMBODIMENT

The hydraulic dashpot 10 of the present invention, as shown in the drawing, includes an elongated outer tubular casing 12 which is externally threaded for engagement in the threaded opening 14 of a stationary frame member 16. A locknut 18 serves to secure the casing 12 in a predetermined axial position in the frame member 16. The casing 12 is formed with a rear bore 20 to present a rear interior rearwardly facing radial annular shoulder 22, with a rear semicircular (in cross section) interior lengthwise slot 24, and with a front radial threaded aperture 26.

Extending lengthwise within and through the casing 12 is a rotatable pressure tube 28 which includes a main body section 30, a rear end section 32, an inner front end section 34, and an outer front end section 36. The main body section 30 presents a rear exterior rearwardly facing radial annular shoulder 38, and is disposed coaxially of the casing 12 to define a generally annular fluid chamber 40 therebetween. Also, the main body section 30 is formed with a rear radial metering port 42 which defines a metering orifice 44 open to the chamber 40, with a pair of front radial passageways 46, and with a front annular collar portion 48. The rear end section 32 is formed with a partially threaded opening 50 through which hydraulic fluid is introduced to completely fill the dashpot 10, and a suitable plug screw 52 is provided therefor. The inner front end section 34 is journaled in the casing 12, a seal ring 54 is interposed therebetween, and a set screw 56 in the casing aperture 26 is releasably engageable with the pressure tube 28 to hold the same in any predetermined desired rotative position. The outer front end section 36 is manually accessible, and presents a front exterior rearwardly facing radial annular shoulder 58 that abuts the forward end of the casing 12.

Arranged at the rear ends of the casing 12 and the pressure tube 28 is a metering sleeve 60 which is formed with an intermediate interior forwardly facing radial annular shoulder 62. The front end of the sleeve 60 abuts the rear casing shoulder 22, while the sleeve shoulder 62 abuts the rear pressure tube shoulder 38. The sleeve 60 and the pressure tube 28 are maintained against axial movement relative to the casing 12 by fastening means in the form of a snap ring 64 engaged in the rear end pressure tube section 32 and against the rear end of the sleeve 60. The sleeve 60 is held against rotation relative to the casing 12 by a ball 66 engaged in a sleeve pocket 68 and in the casing slot 24. A seal ring 70 is interposed between the sleeve 60 and the casing 12, and a seal ring 72 is interposed between the sleeve 60 and the rear end pressure tube section 32. In addition, the sleeve 60 is formed with a generally annular front recess 74, and the inner periphery of the sleeve 60 presents a leading generally annular spiral valve edge 76 of about 360° extent adjacent the plane of the pressure tube orifice 44 for establishing the effective area thereof. Rotation of the pressure tube 28 serves to change the position of the metering port 42 relative to the spiral valve edge 76.

Extending into the forward end of the pressure tube 28 is a tubular piston rod 78 having a closed forward end 80 which is adapted to receive impact forces. Associated with the rearward end of the piston rod 78 is a piston assembly 82 which is axially movable within the pressure tube 28. The piston assembly 82 comprises an annular bearing section 84 secured to the rearward end of the piston rod 78, an annular piston section 86 secured to the piston rod 78 forwardly of the bearing section 84, and an annular piston ring or sleeve 88 axially floatingly disposed intermediate of the bearing section 84 and the piston section 86. The bearing section 84 slidably engages the inner periphery of the pressure tube 28; the outer periphery of the piston section 86 is spaced radially from the inner periphery of the pressure tube 28; and the outer periphery of the piston ring 88 slidably engages the inner periphery of the pressure tube 28, while the inner periphery of the piston ring 88 is spaced radially from the outer periphery of the piston rod 78. Also, the piston rod 78 is formed with a pair of radial ports 90 intermediate the bearing section 84 and the piston section 86. A bearing sleeve 92, held in axial position by a snap ring 94, is interposed between the inner pressure tube front end section 34 and the piston rod 78; and a seal ring 96 and a wiper ring 98, retained against axial outward movement by a snap ring 100, are interposed between the outer pressure tube front end section 36 and the piston rod 78. Additionally, a return spring 102 extends between the closed forward piston rod end 80 and the plug screw 52. In this connection, engagement of the piston section 86 with the bearing sleeve 92 serves to prevent the piston rod 78 from moving axially outwardly of the pressure tube 28 beyond its normal fully extended rest position. Finally, cellular material 104, which may be fabricated of rubber or the like, is disposed in the chamber 40 intermediate of the pressure tube collar portion 48 and the front end of the metering sleeve 60. When the dashpot 10 is to be used, the pressure tube 28 is rotated to dispose the metering port 42 in a position relative to the valve edge 76 corresponding to the desired effective area of the orifice 44.

In the operation of the hydraulic dashpot 10, impact or vibrational forces received by the piston rod 78 cause the latter and the piston assembly 82 to move rearwardly within the pressure tube 28. As rearward movement of the piston assembly 82 commences, pressure initially built up in the hydraulic fluid within the pressure tube 28 rearwardly of the piston assembly 82 causes the floating piston ring 88 to be forced into abutment with the rear side of the piston section 86 (FIG. 3) thereby preventing hydraulic fluid from flowing past the piston section 86. During rearward movement of the piston assembly 82 from the position shown in FIG. 2 toward the position shown in FIG. 3, the hydraulic fluid is forced outwardly of the pressure tube 28 through the metering port 42 and orifice 44 to the chamber 40. At the same time, the chamber 40 communicates through the pressure tube passageways 46 with the interior of the pressure tube 28 permitting some hydraulic fluid to flow to the forward side of the piston assembly 82 as the latter moves rearwardly of the passageways 46. Also, the cellular material 104 compresses to compensate for the fluid displaced by the piston rod 78 during its inward stroke.

When the impact force is removed from the piston rod 78, the spring 102 serves to return the piston rod 78 and piston assembly 82 to the normal rest position shown in FIG. 2. During such forward return motion of the piston assembly 82, the floating piston ring 88 abuts the front side of the bearing section 88. As a consequence, hydraulic fluid is free to flow outwardly of the chamber through the pressure tube passageways 46 and past the piston assembly 82 from the forward to the rearward side thereof through the clearance between the piston section 86 and the pressure tube 28, the clearance between the end of the piston ring 88 and the piston section 86, the clearance between the piston rod 78 and the piston ring 88, and the piston rod ports 90.

The rate at which an impact force is decelerated by the dashpot 10—that is, the rate of kinetic energy absorption—is a function of the rate at which fluid is displaced through the metering orifice 44 which in turn is a function of the effective or exposed area of the latter. The effective area of the orifice 44 may be varied infinitely (within the range of the device) by rotatably adjusting the position of the pressure tube 28 and hence the position of the orifice 44 relative to the leading spiral valve edge 76 of the metering sleeve 60. The degree or extent of adjustment of the orifice 44 per fraction of revolution of the pressure tube 28 depends upon the pitch of the spiral valve edge 76 and the diameter of the metering port 42. Suitable indicia 106 may be applied to the outer front end pressure tube section 36 (FIG. 1); and various calibrated positions of the orifice 44 relative to the metering sleeve spiral valve edge 76, and the corresponding effective or exposed areas of the orifice 44, are shown schematically in FIG. 7.

Among the advantages offered by the dashpot 10 are the following: the various seal rings, which are a minimum in number, may be assembled with minimum or no damage thereto; the provision of the metering port 42 eliminates the use of metering slots and grooves at the surface of the pressure tube 28 which would tend to reduce the strength of the latter; the rotatably adjustable pressure tube 28 affords a fine convenient orifice adjustment with high stability and low sensitivity; and the piston rod 78 is supported at two locations by the bearing section 84 and by the bearing sleeve 92. In sum, the dashpot 10 is more efficient in operation, more durable in service, more compact in construction; more economical to manufacture, and more readily adjustable, than comparable dashpots of the prior art.

While there has been shown and described a preferred embodiment of the present invention, it will be understood by those skilled in the art that various rearrangements and modifications may be made therein without departing from the spirit and scope of the invention.

The invention claimed is:

1. A hydraulic dashpot comprising an elongated outer casing having a forward end and a rearward end, said casing presenting a rear interior rearwardly facing radial annular shoulder, a pressure tube extending lengthwise within said casing and defining a chamber therebetween, said pressure tube presenting a rear exterior rearwardly facing radial annular shoulder, and a front exterior rearwardly facing radial annular shoulder, a piston rod extending outwardly of said forward end of said casing for receiving impact forces, a piston assembly mounted on said piston rod and axially movable within said pressure tube, said pressure tube having a radial metering port formed in the wall thereof which defines an orifice open to said chamber, a metering sleeve surrounding said pressure tube within said casing and having an inner periphery presenting a leading spiral valve edge adjacent the plane of said orifice for establishing the effective area thereof, said metering sleeve abutting said rear shoulders, and said front shoulder abutting said forward end of said casing, said metering sleeve and said pressure tube being maintained against axial movement relative to said casing by fastening means engaged between said metering sleeve and said pressure tube, and relative rotation between said pressure tube and said metering sleeve serving to adjust the relative positions of said orifice and said valve edge to vary the effective area of said orifice whereby to regulate the flow of fluid outwardly of said pressure tube through said metering port to said chamber as said piston assembly moves rearwardly in said pressure tube.

2. The hydraulic dashpot of claim 1 wherein said metering sleeve is stationary, and said pressure tube is rotatable to adjust the position of said orifice relative to said valve edge.

* * * * *